United States Patent [19]
Ohtomo et al.

[11] Patent Number: 5,638,220
[45] Date of Patent: Jun. 10, 1997

[54] DEVICE FOR PRODUCING RING-SHAPED LASER SPOT

[75] Inventors: Fumio Ohtomo; Hiroo Sugai; Youhei Ogawa; Yoshiyuki Enomoto, all of Tokyo, Japan

[73] Assignee: Kabushiki Kaisha Topcon, Tokyo, Japan

[21] Appl. No.: 492,743

[22] Filed: Jun. 21, 1995

[30] Foreign Application Priority Data

Jun. 22, 1994 [JP] Japan .................................. 6-163132

[51] Int. Cl.$^6$ .................................................. G02B 27/09
[52] U.S. Cl. .................................... 359/739; 359/558
[58] Field of Search ................................ 359/719, 738, 359/739, 740, 558, 744, 641

[56] References Cited

U.S. PATENT DOCUMENTS

Re. 32,988   7/1989   Smid ........................................ 359/641
3,990,786   11/1976   Jorna ........................................ 359/739

Primary Examiner—Georgia Y. Epps
Assistant Examiner—John P. Cornely
Attorney, Agent, or Firm—Brumbaugh, Graves, Donohue & Raymond

[57] ABSTRACT

The present invention relates to a projector using laser light, and more particularly to a ring-shaped laser spot capable of forming a projected image having a ring-shaped projected image formed from a diffraction fringe, by interposing a diaphragm between a collimator lens and a target. The collimator lens transmits laser light emitted from a laser light source to the target to form a first projected image on the target. The diaphragm shapes the laser light transmitted through the collimator lens to form a ring-shaped second projected image as a diffraction fringe on the target.

3 Claims, 4 Drawing Sheets

DEVICE FOR PRODUCING RING-SHAPED LASER SPOT

BACKGROUND OF THE INVENTION

The present invention relates to a projector using laser light, and more particularly to a ring-shaped laser spot capable of forming a projected image having a ring-shaped projected image formed from a diffraction fringe, by interposing a diaphragm between a collimator lens and a target.

In recent years, a projector using laser light has been used as a guide for performing tunnel construction, installation work of water supply pipes, sewage pipes, etc., ink marking work at a building construction site, etc. In general, the laser light used in the projector is frequently aimed to decide the center by projection on an object such as a target, so that a projected image formed on the object is circular in many cases. This is due to the fact that if the projected image is elongated in a horizontal, vertical, or oblique direction to be made elliptical or rectangular, it is difficult to decide the center.

Further, the projector using laser light is less frequently used with a fixed distance to the object, but frequently used with a variable distance ranging from a short distance to hundreds of meters. Therefore, a laser spot to be projected is required to have the same size regardless of the distance to the object. To meet this requirement, the projector using laser light employs a collimated light produced by enlarging and projecting the laser light with an optical system.

By enlarging and projecting the laser light with the optical system, a projected image having substantially the same sectional shape as that of a beam of laser light emitted from a light source can be obtained. Accordingly, in a projector using a laser tube as the light source, the projected image by the laser light becomes substantially circular. On the other hand, in a projector using a semiconductor laser as the light source, the projected image by the laser light becomes substantially rectangular. The reason why the projected image obtained by the projector using the semiconductor laser as the light source is rectangular is that a laser emitting surface of the semiconductor laser is rectangular.

To make circular a beam of laser light emitted from the semiconductor laser, it is known to use an anamorphic optical system as one method and use a diaphragm as another method.

According to the method using the anamorphic optical system to make the emergent beam circular, a beam spot with a specified aspect ratio can be obtained by the anamorphic optical system, so that the emergent beam can be made substantially circular by setting the longer dimension substantially identical with the shorter dimension.

On the other hand, the method using the diaphragm to make the emergent beam circular may be realized by the configuration as shown in FIG. 8, which is composed of a semiconductor laser 1100, a focusing lens 2000, a diaphragm 3000, and a collimator lens 4000. A beam of laser light emitted from the semiconductor laser 1100 is first focused by the focusing lens 2000, and is then shaped into a circular shape by the diaphragm 3000. The diaphragm 3000 usually has an optimum opening diameter of about 2 to 3 μm. An unnecessary elliptical portion of the laser beam is cut off by the diaphragm 3000, thereby making the projected image substantially circular.

It is also considered to combine the methods using the anamorphic optical system with the diaphragm, so as to make circular the emergent beam from the semiconductor laser.

However, in the method using the anamorphic optical system to make the emergent beam circular, a sufficiently large optical system must be adopted to obtain a circular beam spot by setting the longer dimension substantially identical with the shorter dimension, because the anamorphic optical system originally functions to obtain a beam spot with a specified aspect ratio. Further, the combination of the anamorphic optical system and the diaphragm brings an increase in number of parts and an increase in cost.

In the method using the diaphragm to make the emergent beam circular, it is difficult to position between the diaphragm and the semiconductor laser, and the semiconductor laser is susceptible to temperature to cause the movement of a light emitting portion. Accordingly, the opening diameter of the diaphragm in practical use must be set to about 100 μm. That is, the opening diameter of the diaphragm is increased to cause a problem such that imperfect ring-shaped diffraction light is mixed in to blur the projected image, resulting in the difficulty of decision of the center.

Further, in the case of a merely uniform circular projected image, the center cannot be specified. Accordingly, the center must be decided by eye measurement in the circular projected image.

Accordingly, it is strongly desired to provide a laser spot which can easily specify the center of a projected image with a simple configuration and at a low cost.

DESCRIPTION OF THE INVENTION (Principle)

A light emitting surface of a semiconductor laser is rectangular. For example, the rectangular surface has a transverse size of about 0.5 μm and a longitudinal size of 2 to 3 μm. In the following description, approximation will be made from the expressions of divergence of a light source having a finite size and divergence of a diffraction beam, and then a value providing a ring by proper diffraction will be obtained.

Figure 2:
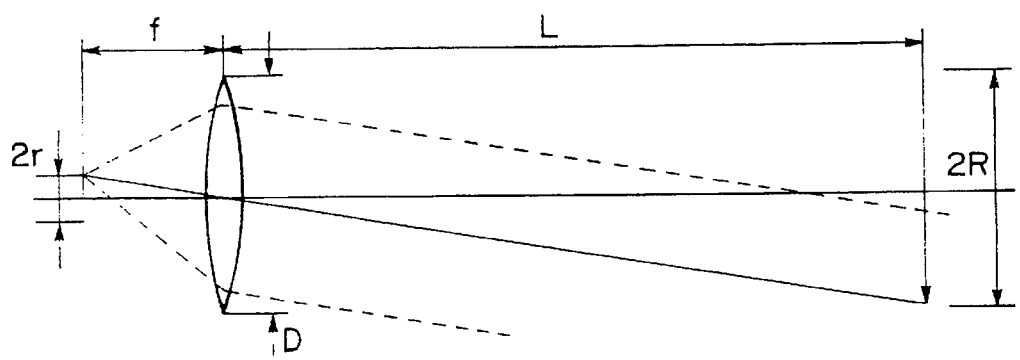
FIGS. 2 and 3 are views illustrating the principle of the present invention.

As shown in FIG. 2, an illumination optical system including a light source having a finite size located at a focal point of a lens generally has a divergence angle θ expressed as follows:

$$\tan\theta = r/f$$

Accordingly, the divergence 2R of a lens image formed at a position spaced from the lens by a distance L is expressed as follows:

$$\begin{aligned} 2R &= 2 \times L \times \tan\theta + D \\ &= L \times (2r/f) + D \end{aligned} \quad (1)$$

where, f: focal length of the lens

D: aperture of the lens
r: size of the light source
λ: wavelength of the light source Nonuniformity of illumination range like an enlarged shape of the light source appears on an observation surface spaced from the lens by the distance L.

Figure 3:
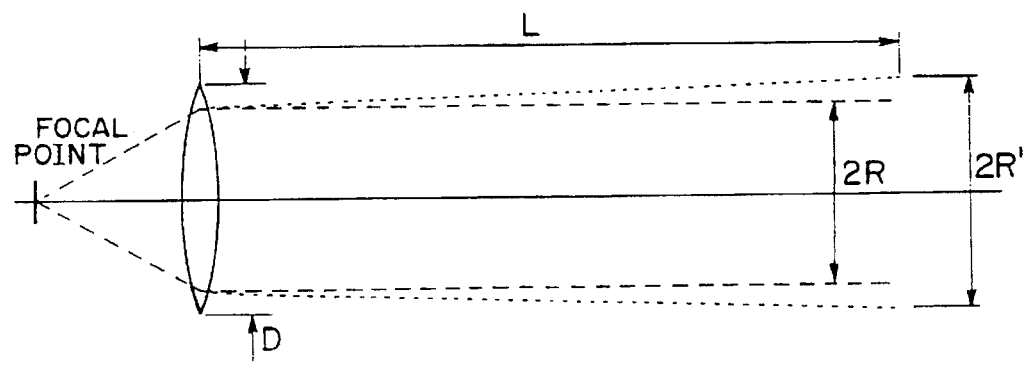

Then, a divergence angle θ of a beam due to diffraction will be considered from the viewpoint of wave optics. As shown in FIG. 3, the following equation is given:

$$\sin\theta = \lambda/D$$

If λ≪D, sin θ≈tan θ

Accordingly, the divergence 2R' of a diffraction image formed at a position spaced from the lens by the distance L is expressed as follows:

$$2R' = 2 \times (\lambda/D) \times L + D \qquad (2)$$

That is, a manner of image blurring changes according to the aperture D of the optical system.

Accordingly, in order to eliminate the nonuniformity of illumination on the observation surface and make the illumination circular, the following condition must be satisfied.

$$2R < 2R' \qquad (3)$$

In other words, the divergence 2R' of the diffraction image must be made larger than the divergence 2R of the lens image.

Accordingly, Eqs. (1) and (2) are substituted in Eq. (3) to give the following inequality.

$$(2r/f) \times L + D < (2 \lambda/D) \times L + D$$

That is, the following condition is obtained.

$$(r/f) < (\lambda/D)$$

Consequently, in order to eliminate the nonuniformity of illumination on the observation surface and make the illumination circular, the following condition must be satisfied.

$$D < (f/r) \times \lambda \text{ or } (r/\lambda) < (f/D) = F_{no} \qquad (4)$$

where $F_{no}$ denotes an F-number.

Further, in consideration of the lens aberration or the like, the condition providing a ring by proper diffraction, and the deformation rate of the light source, the following condition is preferably satisfied to regard the shape of illumination as circular in practical use.

$$R \leq (1.5 \text{ to } 2.0) \times R'$$

Further, the size of illumination at the position spaced from the lens by the distance L is decided by defining the aperture D.

For example, assuming that L=100 m and λ=600 nm, the following equation is given by substituting these values in Eq. (2).

$$\begin{aligned} 2R' &= 2 \times (\lambda/D) \times L + D \\ &= 2 \times (600 \text{ nm}/D) \times 100 \text{ m} + D \end{aligned}$$

In considering the case where 2R' becomes a minimum value, the aperture D becomes about 11 mm, and 2R' is calculated to 21.9 mm.

As a result, an accuracy of about 2 to 3 mm even at sight can be obtained.

Further, assuming that 2r=3 μm, the value of r/λ is calculated as follows:

$$(r/\lambda) = (1.5 \text{ μm}/600 \text{ nm}) = 2.5$$

Accordingly, the range of $F_{no}$ is preferably $F_{no} \geq 5$ from Eq. (4). To improve a convergence efficiency, $F_{no}$ must be reduced and therefore $F_{no}=5$ is selected to give the following value of f.

$$f = F_{no} \times D = 5 \times 11 = 55 \text{ mm}$$

A diffraction fringe will also be taken into consideration.
The first light line appears at the following divergence angle.

$$\sin\theta = (3/2) \times (\lambda/D)$$

Accordingly, the divergence $2R_1'$ at the position spaced from the lens by the distance L becomes as follows:

$$2R_1' = 2 \times (3/2) \times (\lambda/D) \times L + D$$

That is, a ring appears at the position 1.5 times that of a 0-th order diffraction image.

Accordingly, the illumination light can be made ring-shaped.

(Preferred Embodiment)

A preferred embodiment of the present invention will be described with reference to the drawings.

Figure 1:
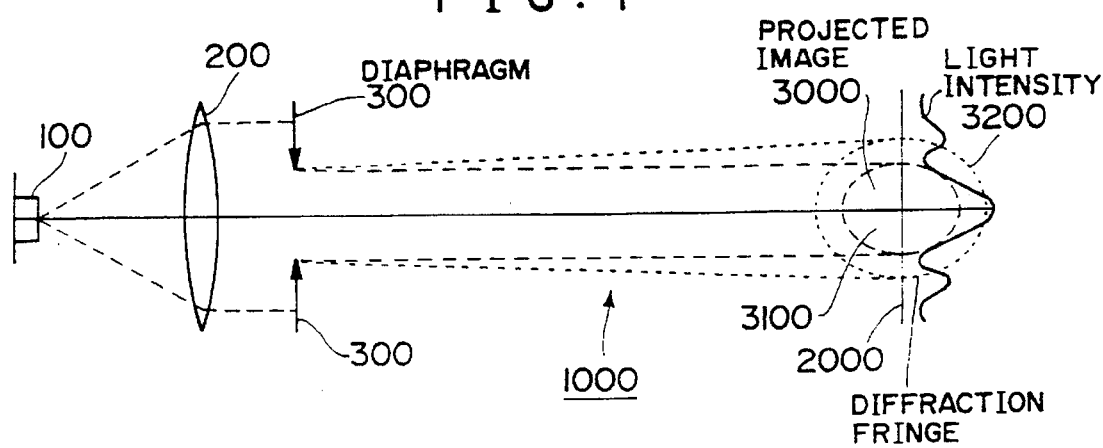
FIG. 1 is a view showing the configuration of a preferred embodiment of the present invention.

FIG. 1 is a view showing the configuration of a ring-shaped laser spot 1000 according to the preferred embodiment. The ring-shaped laser spot 1000 is composed of a light emitting element 100, a collimator lens 200, and a diaphragm 300.

The light emitting element 100 corresponds to the laser light source in the present invention, and it serves to emit laser light. The light emitting element 100 is located at a focal point of the collimator lens 200. The light emitting element 100 may be any element capable of emitting laser light, such as a semiconductor laser or a laser tube.

The collimator lens 200 corresponds to the light transmitting means in the present invention, and it serves to collimate the laser light emitted from the light emitting element 100 and transmit it to a target 2000. The light transmitting means is not limited to the collimator lens 200, but may be any element capable of collimating the laser light emitted from the light emitting element 100.

The diaphragm 300 is inserted between the collimator lens 200 and the target 2000, and serves to generate a diffraction fringe in a projected image 3000 formed on the target 2000 and form a ring-shaped projected portion 3200 in the projected image 3000. The diaphragm 300 corresponds to the diaphragm member in the present invention.

In this preferred embodiment having the above configuration, when the light emitting element 100 is driven, laser light is emitted from the light emitting element 100, and is transmitted through the collimator lens 200 to the target 2000. The laser light transmitted through the collimator lens 200 is limited by the diaphragm 300 and is circularly projected on the target 2000, thereby forming a circular projected image 3100 corresponding to the first projected image in the present invention.

Further, light has such a property as a wave to diffract behind an obstacle to generate a diffraction fringe. The diffraction fringe is formed as a ring at the radius $R_1'$, and the ring-shaped projected portion 3200 corresponding to the second projected image in the present invention is therefore formed at the radius $R_1$.

Accordingly, the projected image 3000 formed on the target 2000 is a combination of the circular projected portion 3100 and the ring-shaped projected portion 3200 formed at the radius $R_1$. That is, as understood from the light intensity shown in FIG. 1, the projected image 3000 includes a central circular light portion corresponding to the circular projected portion 3100, a relatively dark annulus surrounding the central circular light portion, and a light portion corresponding to the ring-shaped projected portion 3200 surrounding the relatively dark annulus.

To prevent nonuniformity of illumination in the circular projected portion 3100, the divergence 2R' of the diffraction image must be made greater than the divergence 2R of the lens image.

To meet the requirement of R<R', the following condition as defined in Eq. (4) must be satisfied.

$$D<(f/r)\times\lambda \text{ or } (r/\lambda)<(f/D)=F_{no}$$

Further, to obtain a sufficient circularity of the circular projected portion 3100, it is desirable to satisfy $R\leq(1.5$ to $2.0)\times R'$.

The projected image 3000 formed by the ring-shaped laser spot 1000 mentioned above includes the ring-shaped projected portion 3200 around the circular projected portion 3100. Therefore, the center of the projected image 3000 can be easily decided.

To improve the convergence efficiency of the ring-shaped laser spot 1000, it is preferable to reduce the intensity of the diffraction fringe or reduce the deformation rate of the light source.

To reduce the intensity of the diffraction fringe, it is preferable to add an apodization filter 400, for example, to the diaphragm 300. The apodization filter 400 is a filter such that the density at the outer peripheral portion is high and is gradually reduced toward the central portion. Usually, the diffraction fringe generated includes several lines rather than one line, and the more distant from the center, the lower the light intensity.

Figure 4:
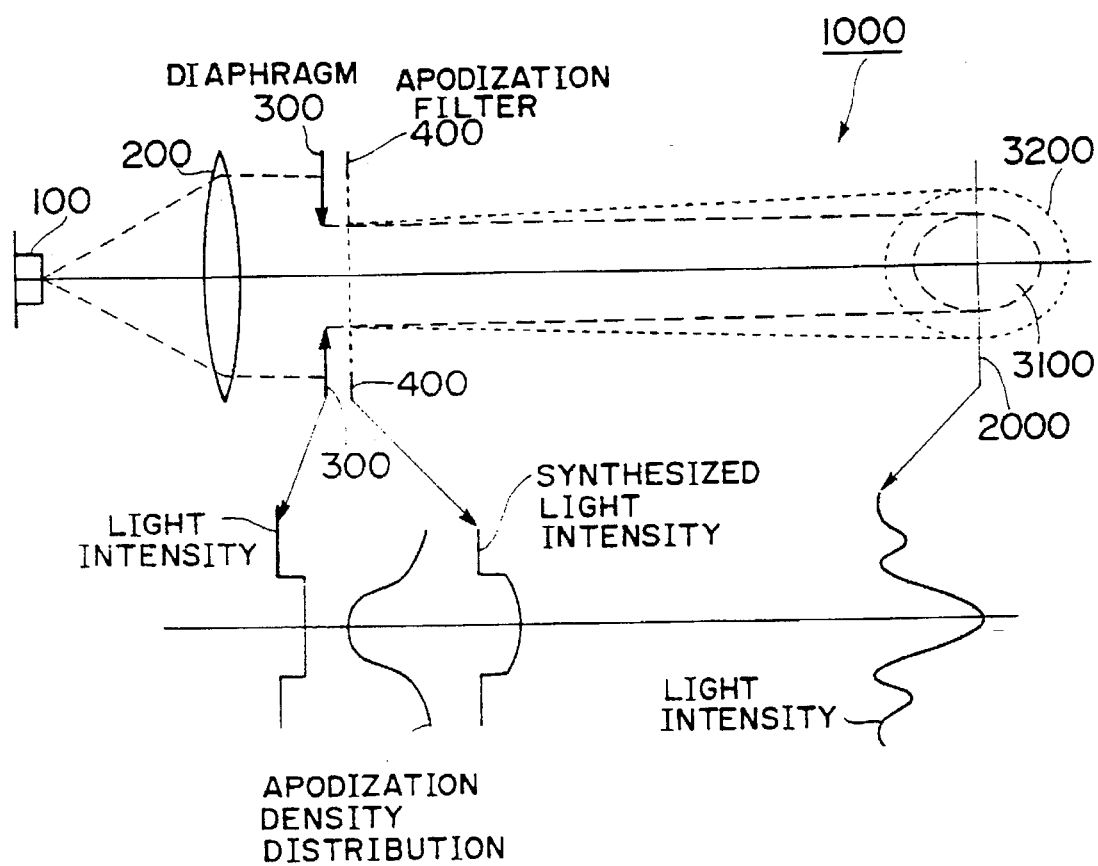
FIG. 4 is a view showing the configuration of another preferred embodiment of the present invention incorporating an apodization filter.

As shown in FIG. 4, the addition of the apodization filter 400 to the ring-shaped laser spot 1000 according to this preferred embodiment can reduce the intensity of the peripheral diffraction fringe except the diffraction fringe near the center, thereby improving the convergence efficiency.

Further, to reduce the deformation rate of the light source for the improvement in the convergence efficiency, it is preferable to add an anamorphic optical system. Further, the addition of the anamorphic optical system in combination with the apodization filter 400 is more effective.

Accordingly, by adding the anamorphic optical system and the apodization filter 400 to this preferred embodiment, the convergence efficiency can be more improved.

There will now be described an application of this preferred embodiment with reference to FIGS. 5 to 7, in which the preferred embodiment is applied to a laser aiming device.

Figure 5:
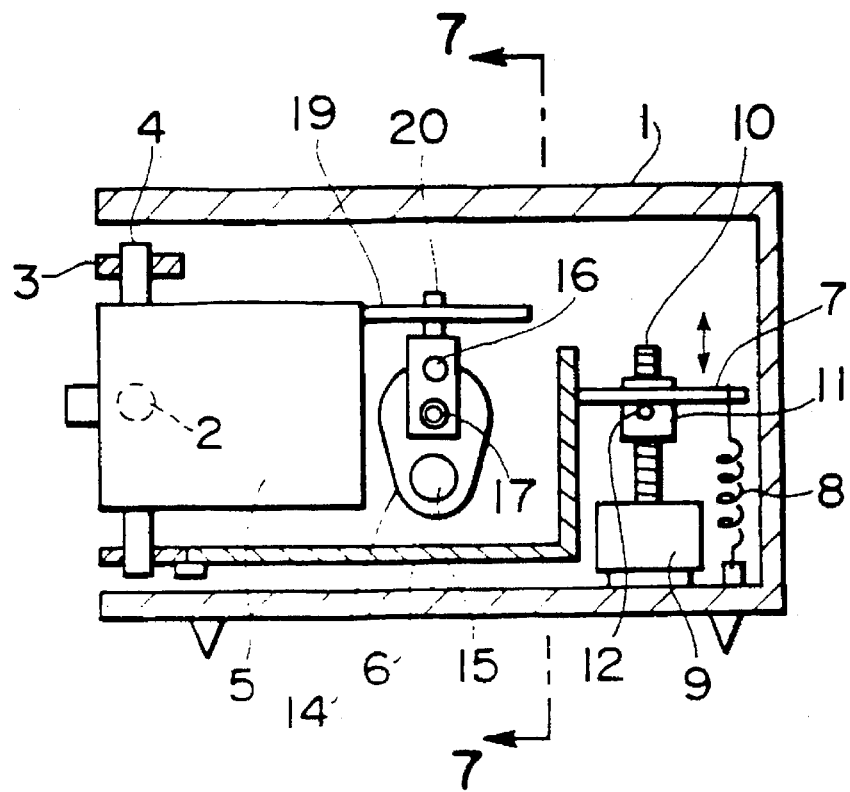
FIGS. 5, 6, and 7 are views showing an application of the preferred embodiment.
Figure 6:
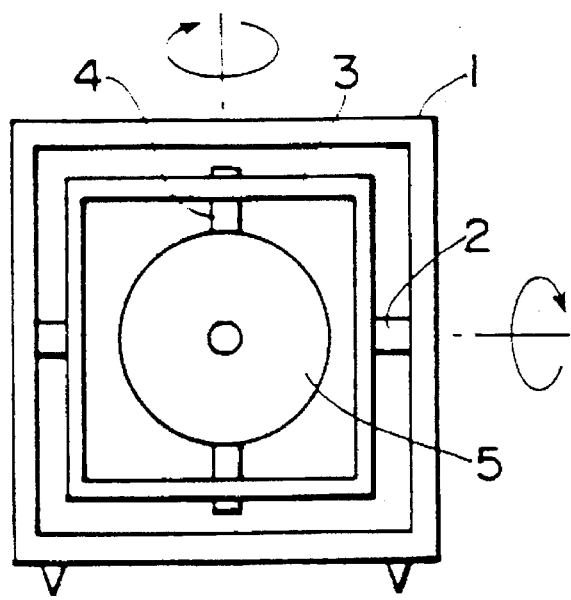

As shown in FIGS. 5 and 6, the laser aiming device is composed of a frame 1, a tilting frame 3 pivotally mounted on a horizontal tilt shaft 2 formed in the vicinity of the front end of the frame 1, and a laser oscillating device 5 pivotally mounted on a vertical swivel shaft 4 mounted to the tilting frame 3.

A horizontal auxiliary frame 6 is formed at a lower portion of the tilting frame 3 so as to extend rearward. The horizontal auxiliary frame 6 is formed with a horizontal pin 7. The horizontal pin 7 is connected through a spring 8 to the frame 1, so that the tilting frame 3 is biased clockwise as viewed in FIG. 5 by an elastic restoring force of the spring 8.

A tilt screw 10 extends in a direction substantially perpendicular to the pin 7. A nut 11 is threadedly engaged with the tilt screw 10, and a fixing pin 12 projecting from the nut 11 is engaged with the tilt screw 10. The tilt screw 10 is connected to an output shaft of a tilt motor 9 placed on the frame 1, so that a tilt angle of the tilting frame 3 can be varied by a driving force of the tilt motor 9.

Figure 7:
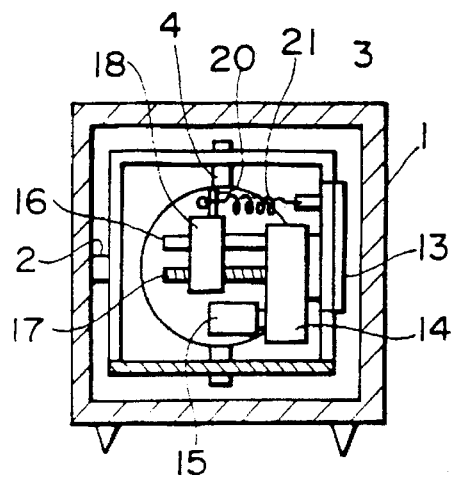
Figure 8:
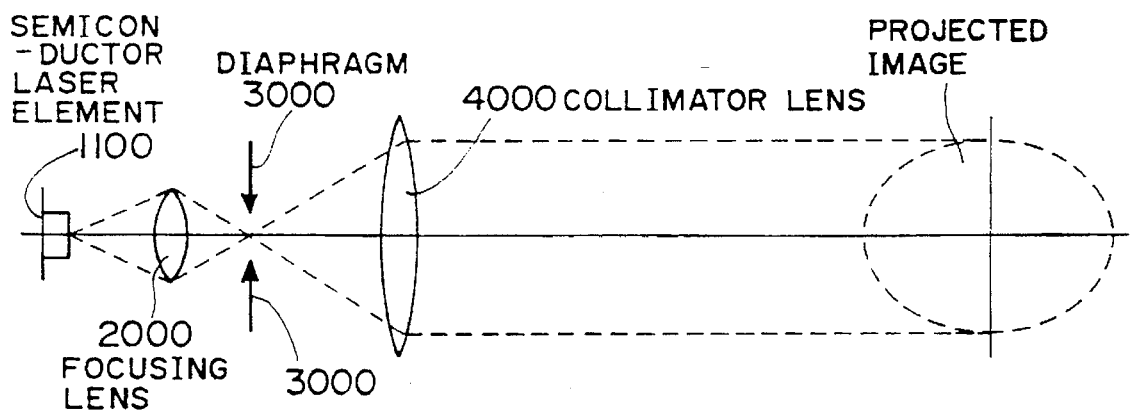
FIG. 8 is a view showing the prior art.

As shown in FIG. 7, a vertical auxiliary frame 13 is formed at a side portion of the tilting frame 3. A swivel motor 15 is mounted through a gear box 14 to the vertical auxiliary frame 13. A guide shaft 16 and a swivel screw 17 extend horizontally from the gear box 14. The swivel screw 17 is connected to an output shaft of the swivel motor 15. A nut block 18 is threadedly engaged with the swivel screw 17, and is slidably engaged with the guide shaft 16.

A horizontal pin 19 projects from the rear end of the laser oscillating device 5. The horizontal pin 19 is engaged with a pin 20 formed on the nut block 18. A spring 21 is interposed between the horizontal pin 19 and the vertical auxiliary frame 13, so that the laser oscillating device 5 is biased horizontally, i.e., rightward as viewed in FIG. 7 by an elastic restoring force of the spring 21.

The laser aiming device having the above configuration can be pivoted in two orthogonal directions by driving the tilt motor 9 and the swivel motor 15.

The laser oscillating device 5 includes the ring-shaped laser spot 1000 according to the above preferred embodiment.

According to the present invention as described above, the laser light source emits laser light, and the light transmitting means transmits the laser light to the target, thereby forming the first projected image on the target. The diaphragm member interposed between the light transmitting means and the target shapes the laser light to form the ring-shaped second projected image as a diffraction fringe on the target. Therefore, the center of the projected image can be easily decided by the ring-shaped second projected image.

Preferably, according to the present invention, the light transmitting means is a collimator lens, and the following condition is satisfied.

$$D<(f/r)\times\lambda \text{ or } (r/\lambda)<(f/D)=F_{no}$$

In this case, the nonuniformity of illumination of the projected image can be prevented.

Further, according to the present invention, let 2R' denote the divergence of a diffraction image and 2R denote the divergence of an image by the collimator lens, the condition of $R\leq(1.5$ to $2.0)\times R'$ is preferably satisfied.

Further, according to the present invention, an apodization filter may be used in combination with a diaphragm member.

What is claimed is:

1. A device for producing a ring-shaped laser beam spot comprising:

a laser light source for emitting laser light;

a light transmitting means which includes a collimator lens for transmitting said laser light emitted from said laser light source to a target to form a first projected image on said target; and a diaphragm member formed between said light transmitting means and said target for forming a ring-shaped second projected image as a diffraction fringe on said target, wherein said device satisfies one of the following conditions:

$$D<(f/r)\times\lambda \text{ or } (r/\lambda)<(f/D)=F_{no},$$

where D is the aperture of said collimator lens, f is the focal length of said collimator lens, r is the size of said laser light source, $\lambda$ is the wavelength of said laser light source and $F_{no}$ stands for F-number.

2. A device for producing a ring-shaped laser beam spot according to claim 1 which satisfies the following condition:

$$R \leq (1.5 \text{ to } 2.0) \times R',$$

where R is the divergence of said first projected image and R' is the divergence of said ring-shaped second projected image.

3. A device for producing a ring-shaped laser beam spot according to claim 1 or 2, wherein an apodization filter is added to said diaphragm member.

* * * * *